United States Patent [19]

Aeberli

[11] 4,055,556

[45] Oct. 25, 1977

[54] MONOAZO AND DISAZO COMPOUNDS HAVING OPTIONALLY FURTHER SUBSTITUTED 2-ACYL-, CARBOXY- OR CYANO-BENZOTHIENYL DIAZO COMPONENT RADICALS

[75] Inventor: Max Aeberli, Riehen, Switzerland

[73] Assignee: Sandoz Ltd., Basel, Switzerland

[21] Appl. No.: 502,445

[22] Filed: Sept. 3, 1974

[30] Foreign Application Priority Data

Sept. 6, 1973 Switzerland ............... 12814/73

[51] Int. Cl.$^2$ ............... C09B 29/20; C09B 29/32; C09B 29/36; C09B 33/14
[52] U.S. Cl. ............... 260/152; 106/23; 106/288 Q; 106/308 Q; 260/37 R; 260/155; 260/156; 260/157; 260/158; 260/162; 260/163; 260/764
[58] Field of Search ............... 260/152, 155, 156, 157, 260/158, 162, 163; 8/4, 7; 424/264, 265, 267; 106/288 Q, 368 Q

[56] References Cited

U.S. PATENT DOCUMENTS

| | | | |
|---|---|---|---|
| 2,338,728 | 1/1944 | McNally et al. | 260/152 |
| 2,560,502 | 7/1951 | Bestehorn et al. | 260/152 X |
| 2,825,726 | 3/1958 | Towne et al. | 260/152 |
| 2,827,450 | 3/1958 | Towne et al. | 260/152 |
| 2,893,986 | 7/1959 | Long et al. | 260/152 |
| 3,491,083 | 1/1970 | Mangini et al. | 260/162 |
| 3,526,618 | 9/1970 | Horstmann et al. | 260/152 |
| 3,527,745 | 9/1970 | Mangini et al. | 260/146 R |
| 3,574,181 | 4/1971 | Forter et al. | 260/152 |
| 3,849,394 | 11/1974 | Roueche et al. | 260/155 |

FOREIGN PATENT DOCUMENTS

| | | | |
|---|---|---|---|
| 801,805 | 1/1974 | Belgium | 260/152 |
| 802,085 | 1/1974 | Belgium | 260/152 |
| 2,304,203 | 1/1972 | Germany | 260/152 |
| 352,920 | 9/1972 | U.S.S.R. | 260/152 |

OTHER PUBLICATIONS

Beck, J. Org. Chem., vol. 37, pp. 3224–3226 (1972).
Ito et al., Chemical Abstracts, vol. 77, No. 21550; (1972).
Kamel et al., J. Prakt. Chem., vol. 313, pp. 1131–1138 (1971).

Primary Examiner—Floyd D. Higel
Attorney, Agent, or Firm—Gerald D. Sharkin; Richard E. Vila; Melvyn M. Kassenoff

[57] ABSTRACT

Compounds free of sulfo groups having the formula $$\left[ (R_1)_n \underset{S}{\underset{\|}{\bigodot}} \underset{R_2}{\overset{N=N-K}{\bigodot}} \right]_m$$

in which $n$ is 0, 1 or 2, $R_1$ signifies halogen, substituted or unsubstituted alkyl, cycloalkyl, alkoxy or cycloalkoxy, trifluoromethyl or nitro, the $R_1$'s being the same or different when $n$ is 2, $R_2$ signifies carboxyl, aminocarbonyl, alkylaminocarbonyl, cycloalkylaminocarbonyl, dialkylaminocarbonyl, phenylaminocarbonyl, alkoxycarbonyl, cycloalkoxycarbonyl, phenoxycarbonyl, or cyano, any alkyl, alkoxy, cycloalkyl, cycloalkoxy, phenyl or phenoxy moiety being unsubstituted or substituted, K signifies a coupling component radical, and $m$ is 1 or 2, are useful as pigments for paints, inks, varnishes, plastics, printing pastes and paper and disperse dyes for synthetic and semisynthetic fibers such as linear aromatic polyesters, cellulose acetates and synthetic polyamides. The pigments exhibit notable fastness to, for example, heat, light, weathering, migration, varnishing, solvents, sulfur dioxide and alkalis and resistance to flocculation and crystallization while the disperse dyes possess notable fastness to, for example, light, heat treatments, wet treatments, solvents, lubricants, rubbing, crossdyeing, ozone, flue gases and chlorine.

53 Claims, No Drawings

MONOAZO AND DISAZO COMPOUNDS HAVING OPTIONALLY FURTHER SUBSTITUTED 2-ACYL-, CARBOXY- OR CYANO-BENZOTHIENYL DIAZO COMPONENT RADICALS

The invention relates to azo compounds free from sulphonic acid groups.

The invention provides compounds of formula I,

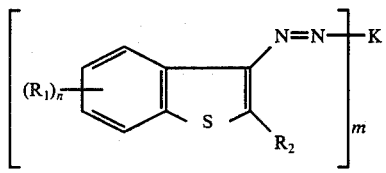

I in which $n$ is 0, 1 or 2, $R_1$ signifies halogen, substituted or unsubstituted alkyl, cycloalkyl, alkoxy or cycloalkoxy, trifluoromethyl or nitro, the $R_1$'s being the same or different when $n$ is 2, $R_2$ signifies carboxyl, aminocarbonyl, alkylaminocarbonyl, cycloalkylaminocarbonyl, dialkylaminocarbonyl, phenylaminocarbonyl, alkoxycarbonyl, cycloalkoxycarbonyl, phenoxycarbonyl, or cyano, any alkyl, alkoxy, cycloalkyl, cycloalkoxy, phenyl or phenoxy moiety being unsubstituted or substituted, K signifies a coupling component radical, and $m$ is 1 or 2, which compounds are free from sulphonic acid groups.

Any alkyl or alkoxy radical or moiety, as or contained in $R_1$ or $R_2$, in the compounds of formula I is preferably of 1 to 8 carbon atoms, more preferably of 1,2,3 or 4 carbon atoms. As examples of substituents on such alkyl and alkoxy radicals or moieties may be given halogen, cyano, hydroxy, $C_{1-4}$alkoxy, phenyl, phenoxy, acyl, acyloxy or acylamino, the highest number of substituents being two, preferably one, particularly where such substituent is phenyl or one, particularly where such substituent is phenyl or phenoxy. Any cycloalkyl or cycloalkoxy radical or moiety in the compounds of formula I preferably contains 5 to 8, more preferably 6, ring carbon atoms. As examples of substituents on such cycloalkyl or cycloalkoxy radicals or moieties may be those given above for alkyl or alkoxy and, additionally, $C_{1-4}$alkyl, preferably methyl, groups. The cycloalkyl and cycloalkoxy radicals or moieties may bear up to two, preferably up to one, substituent.

Any phenyl in any phenylamino and any phenoxy in any phenoxycarbonyl group as $R_2$ may, for example, bear as substituents any of the substituents given above for alkyl or alkoxy and, additionally, $C_{1-4}$alkyl or nitro. Again, preferably no more than two substituents are borne thereby, unsubstituted or monosubstituted phenyl being further preferred, particularly unsubstituted phenyl.

Any halogen in the compounds of formula I may be fluorine, chlorine or bromine, chlorine and bromine being preferred.

By acyl, as used herein, is to be understood radicals of the formula R—Y— or R'—Z—, in which R is unsubstituted or substituted $C_{1-4}$alkyl or phenyl, R' is hydrogen, or unsubstituted or substituted $C_{1-4}$alkyl or phenyl, Y is —O—CO—, —SO$_2$— or —O—SO$_2$— and Z is —CO—, —NR"CO— or —NR"SO$_2$—, where R" has one of the significances of R', above. Any alkyl or phenyl radical as R, R' or R" may be substituted as described above for alkyl and phenyl radicals, with the proviso that no substituent thereon is acyl, acyloxy or acylamino. The preferred acyl radicals are unsubstituted $C_{1-4}$(alkoxy)carbonyl, unsubstituted $C_{1-4}$alkoxycarbonyl and benzoyl radicals.

By acyloxy and acylamino, as used herein, are to be understood acyl groups, as defined above, bound through oxygen or amino groups, respectively.

Preferred coupling component radicals as K are those of the benzene, naphthalene, pyrazolone or pyridone series and those derived from acyclic compounds having an active methylene group.

The preferred compounds of formula I are the compounds of formula I',

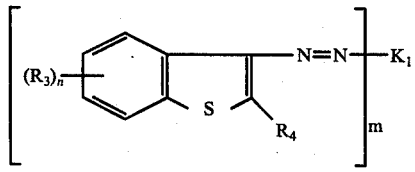

I' in which $n$ is 0, 1 or 2, $R_3$ signifies chlorine, bromine, methyl, $C_{1-4}$ alkoxy, trifluoromethyl or nitro, and, when $n$ and 2, the $R_3$'s may be the same or different, $R_4$ signifies $C_{1-4}$alkoxycarbonyl, phenoxycarbonyl, aminocarbonyl, $C_{1-4}$alkylaminocarbonyl, di-($C_{1-4}$)alkylaminocarbonyl, phenylaminocarbonyl or carboxyl, either $m$ signifies 1 and $K_1$ signifies a radical of formula (a), (b), (c), (d) or (e)

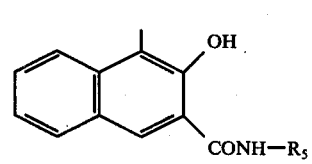

(a)

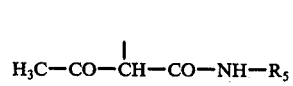

(b)

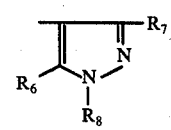

(c)

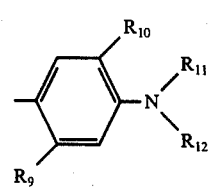

(d)

or (e)

[Structure: pyridone ring with CH3, CN, =O, HO, N-R13 substituents]

in which R₅ signifies a phenyl radical, unsubstituted or substituted by up to 3 substituents selected from chlorine, bromine, methyl, methoxy, an trifluoromethyl, or a 5-benzimidazolonyl radical, R₆ signifies hydroxy or amino, R₇ signifies hydrogen, methyl, phenyl, methoxycarbonyl or ethoxycarbonyl, R₈ signifies hydrogen, methyl, ethyl or phenyl, which phenyl is unsubstituted or substituted by up to three substituents selected from chlorine, bromine, cyano, nitro, methyl, methoxy and ethoxy, R₉ signifies hydrogen, methyl, formylamino, alkylcarbonylamino, alkoxycarbonylamino or alkylsulphonylamino, in which the alkyl and alkoxy moieties are of 1 to 4 carbon atoms, unsubstituted or substituted by a substituent selected from chlorine, bromine, phenyl, $C_{1-4}$alkoxy and phenoxy, R₁₀ signifies hydrogen, methoxy or ethoxy, R₁₁ signifies $C_{1-4}$alkyl, unsubstituted or substituted by a substituent selected from chlorine, bromine, cyano, hydroxy, methoxy, ethoxy, phenyl, phenoxy, $C_{1-4}$alkylcarbonylamino, $C_{1-4}$alkylcarbonyloxy, $C_{1-4}$alkoxycarbonyl and $C_{1-4}$alkoxycarbonyloxy, R₁₂ signifies hydrogen or one of the significances of R₁₁, above, R₁₃ signifies hydrogen, phenyl, amino, $C_{1-4}$alkylamino, di-($C_{1-4}$-alkyl)amino or one of the significances of R₁₁, above, or m signifies 2 and K₁ signifies a group of formula (f) or (g)

(f)

[Structure: two naphthol groups linked by CO—NH—X—HN—OC]

(g)

H₃C—CO—CH—CO—NH—X—HN—CO—CH—CO—CH₃ where X signifies a direct bond or a group of formula (i), (ii), (iii) or (iv)

(i) [phenylene]

(ii) [biphenylene with R₁₄]

(iii) [two phenyls with R₁₅] or (iv) [naphthalene]

in which the aromatic nuclei are unsubstituted or substituted by up to two substituents selected from chlorine, bromine, nitro, cyano, trifluoromethyl, methyl, methoxy, ethoxy, methoxycarbonyl and ethoxycarbonyl, R₁₄ signifies two hydrogen atoms or a bridge —SO₂—, —NH—, —O— or —S—, and R₁₅ signifies a bridge —O—, —S—, —CH₂—, —NH—, —CO— or —SO₂—.

As a first preferred class of compounds of formula I' may be given the compounds of formula Ia', Ia'

[Structure: benzothiophene with (R₁₈)ₙ, N=N—K₂, CO—R₁₉, bracketed with subscript m]

in which n is 0, 1 or 2,

R₁₈ signifies chlorine, bromine, methyl, methoxy, ethoxy, trifluoromethyl or nitro, and, when n is 2, the R₁₈'s may be the same or different, R₁₉ signifies $C_{1-4}$-alkoxy, amino, methylamine, ethylamino, dimethylamino, diethylamino or phenylamino, either m is 1 and K₂ signifies a radical of formula (a'), (b') or (e')

(a')

[Structure: naphthol with OH, CH₃, CONH—R₂₀]

(b')

H₃C—CO—CH—CO—NH—R₂₀

(e')

[Structure: pyridone with CH₃, CN, =O, HO, N-H]

in which R₂₀ signifies either a phenyl radical, unsubstituted or substituted by up to three substituents selected from chlorine and methoxy, or a benzimidazolonyl-5 radical, or m signifies 2, and K₂ signifies a group of formula (f'), (ga') or (gb')

(f')

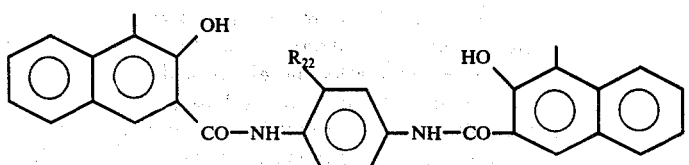

(ga')

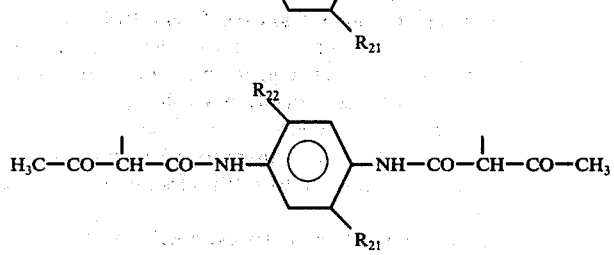

(gb')

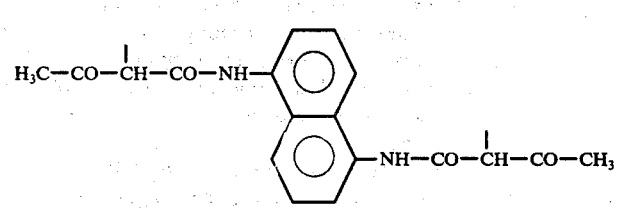

in which $R_{21}$ and $R_{22}$, independently, signify hydrogen, chlorine, bromine, methyl or methoxy.

In the compounds of formula Ia' $n$ preferably signifies 0 or 1. $R_{18}$ preferably signifies chlorine, bromine or nitro. $R_{19}$ preferably signifies methoxy or ethoxy. $m$ preferably signifies 1. $K_2$ preferably signifies a radical (a') or (b'). $R_{20}$ preferably signifies benzimidazolonyl-5.

As used herein, terms such as $C_{1-4}$alkoxycarbonyl and $C_{1-4}$alkylaminocarbonyl are intended to mean that the alkyl and alkoxy moieties contain 1 to 4 carbon atoms.

As a second preferred class of compounds of formula I' may be given the compounds of formula Ib',

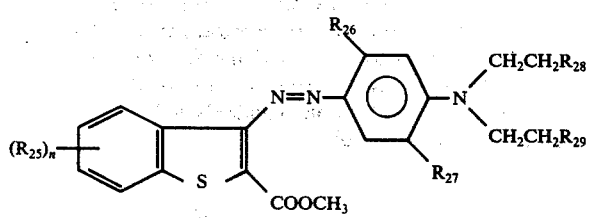

Ib' in which $n$ is 0, 1 or 2, $R_{25}$ signifies chlorine, bromine or nitro and when $n$ is 2, the $R_{25}$'s are the same or different, $R_{26}$ signifies hydrogen, methyl, $C_{1-4}$alkylcarbonylamino or $C_{1-4}$alkoxycarbonylamino, $R_{27}$ signifies hydrogen, methoxy or ethoxy, and $R_{28}$ and $R_{29}$, independently, signify hydrogen, cyano, hydroxy, $C_{1-4}$alkylcarbonyloxy, $C_{1-4}$alkoxycarbonyl or $C_{1-4}$alkoxycarbonyloxy.

The invention also provides a process for the production of compounds of formula I, characterised by a. coupling a diazo derivative of a compound of formula II,

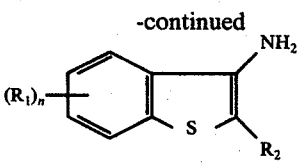

-continued in which $R_1$, $R_2$ and $n$ are as defined above, with a compound of formula III, $$K\text{-(H)}_m \qquad \qquad III$$

in which K and $m$ are as defined above, the mol ratio of the diazo derivative of the compound of formula II to the compound of formula III preferably being $m:1$, or (b) obtaining a compound of formula I, in which $m$ signifies 2, K signifies a group of formula (f) and $R_2$ is other than carboxyl, by condensing a compound of formula IV,

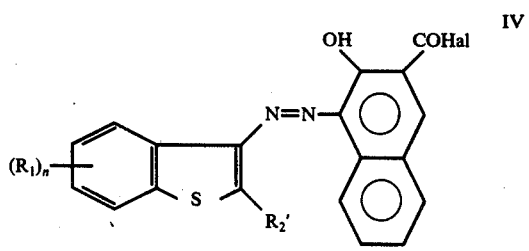

II in which $R_1$ and $n$ are as defined above, $R_2'$ has the same significance as $R_2$, above, with the proviso that it is other than carboxy, and Hal signifies chlorine or bromine, with a compound of formula V,

X—(NH$_2$)$_2$  V in which X is as defined above, the mol ratio of the compound of formula IV to the compound of formula V preferably being 2:1.

The above processes may be carried out in manner conventional for the types of reaction involved.

Thus, for example, process (a) may be carried out at a temperature of from −10° to +70° C. The reaction is conveniently carried out at a pH of from 1 to 7. The reaction may be carried out in an aqueous medium, an inert organic solvent medium or in an aqueous/organic solvent medium.

Process b), for example, may be carried out in an anhydrous organic, preferably aromatic, solvent. It is advantageous to carry out the reaction in the presence of an acid binding agent, such as alkali metal acetates, bicarbonates or carbonates, or organic bases, such as pyridine.

The compounds of formulae II, III and V are known or may be obtained in conventional manner from available starting materials.

The compounds of formula IV may be obtained by diazotization of an amine of formula II, coupling with 2-hydroxy-3-naphthatenecarboxylic acid and converting the free acid into the acid chloride or bromide, such reactions being carried out in conventional manner.

The resulting compounds of formula I may be isolated and purified in conventional manner.

The compounds of formula I are colourants, falling into the class of pigments/disperse dyestuffs, it being within the skill of the man in the art to determine which compounds fall into the category of pigments and which fall into the category of disperse dyes, having regard to the physical characteristics required of such categories, e.g. relative solubility in water and/or organic solvents such as in the aprotic solvents, e.g. dimethylformamide, dimethylacetamide, dimethylsulphoxide or dimethylsulphone, dioxane, alcohols and ketones, the compounds relatively insoluble in such solvents being indicated for use as pigments, those relatively soluble being indicated for use as disperse dyestuffs.

The compounds of formula Ia' are pigments and the compounds of formula Ib' are disperse dyestuffs.

Those compounds of formula I indicated for use as pigments, particularly the compounds of formula Ia', may be used in normal pigment applications e.g. in the production of oil or water-based paints, inks and varnishes, for pigmentation of plastics in the mass, e.g. polyethylene, polystyrene, polyvinyl chloride, rubber and synthetic leather, for the production of printing pastes, fo the stock dyeing of paper and for textile coatings. The dyeings obtained have notable fastness properties to heat, light, weathering, migration, blooming, varnishing, and solvents and have notable resistance to chemicals, in particular to sulphur dioxide and alkalis. The compounds give good colour intensity and have notable application properties, e.g. fastness to flocculation and crystallization, dispersibility and covering power.

The pigmenting properties of the compounds can be enhanced by conventional pigment processing, e.g. by treating the compounds in organic media at an elevated temperature, e.g. 110° to 200° C. Suitable media, in which the compounds themselves are not, however, dissolved, include chlorobenzene, mixtures of di and tri-chlorobenzenes, nitrobenzene, dimethylformamide, glacial acetic acid, ethylene glycol and quinoline.

The compounds of formula I indicated for use as disperse dyes are preferably first converted into dyeing preparations in conventional manner, e.g. by grinding with dispersing agents and/or fillers, followed by vacuum or spray drying, whereafter they may be used in conventional manner, e.g. from an aqueous suspension or paste for dyeing or printing textile substrates containing hydrophobic, synthetic or semi-synthetic fibres, particularly fibres of linear aromatic polyesters, cellulose-2½ acetate, cellulose triacetate or synthetic polyamides.

The dyeings obtained possess notable fastness properties to light, heat-setting, sublimation, pleating, water, sea water, perspiration, washing, solvents, e.g. dry-cleaning solvents, lubricants, rubbing, cross-dyeing, ozone, flue gases and chlorine, as well as showing notable resistance to permanent press processes and soil release finishes.

The invention is illustrated by the following Examples, in which the parts and percentages are by weight and the temperatures in degrees centigrade.

EXAMPLE 1

24.2 Parts 3-amino-6-chlorobenzo-(b)-thiophene-2-carboxylic acid methyl ester are stirred for 1 hour in 35 parts 30% hydrochloric acid and 100 parts water and diazotized after the addition of 150 parts ice with 26 parts by volume 4N aqueous sodium nitrite solution. Stirring is continued for a further hour, a small amount of amidosulphonic acid is added, the whole is filtered and the pH is adjusted to 3.6 with 60 parts of volume 50% aqueous sodium acetate solution. Coupling is effected by allowing a solution of 32 parts 5-(2'-hydroxy-3'-naphthoylamino)-benzimidazolone in 200 parts water and 14 parts of volume 30% caustic soda solution to flow in slowly at 0° to 5° with good stirring. The whole is stirred for 1 hour at 0° to 5° and for an hour at 80°, it is then filtered, washed with water until free of salt and the residue is dried at approximately 80° in a vacuum. A pigment of the formula

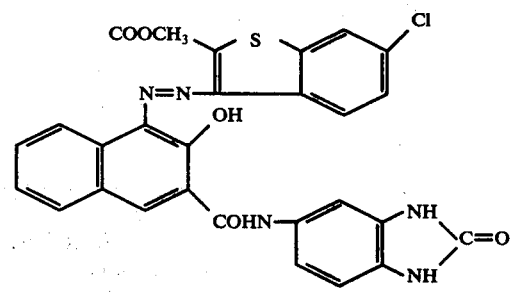

is obtained which dyes plastics in yellow- to brownish-red shades. To improve the fastness and application properties, particularly the rheological behaviour and the dispersibility, the pigment may be treated with solvent, e.g. dimethylformamide.

Replacing the 24.2 parts of 3-amino-6-chlorobenzo-[b]-thiophene-2-carboxylic methyl ester by 25.2 parts of 3-amino-5-nitrobenzo-[b]-thiophene-2-carboxylic acid methyl ester, the pigment of the formula

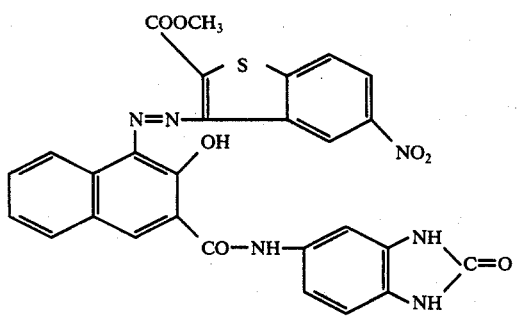

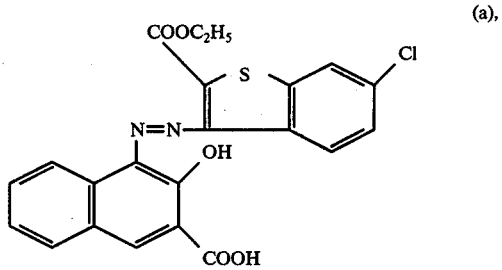

is obtained. Applied on polyvinyl chloride it gives brownish-red dyeings.

The following Table 1 contains other diazotizable amines and coupling components which can be converted into valuable pigments according to the previous Example.

In Tables 1, 2 and 3 the diazo component agrees with the formula obtained by coupling diazotized 3-amino-6-chlorobenzo-[b]thiophene-2-carboxylic acid ethyl ester and 2-hydroxynaphthalene-3-carboxylic acid, are added to 500 parts of nitrobenzene, 1 part of dimethylformamide and 18 parts of thionyl chloride. The mixture is heated to 105°–110° over the course of 6 hours with stirring. The reaction solution is then cooled to 70°–80° and the excess thionyl chloride, together with a small quantity of nitrobenzene, is distilled off under vacuum. 5.4 Parts of para-phenylene diamine are added to the residue and

TABLE 1

| Exp. No. | $(R_1)_n$ | B | Coupling Component | Shade of pigmentation in polyvinyl chloride |
|---|---|---|---|---|
| 2 | 6-Cl | —OC$_2$H$_5$ | 5-(2'-Hydroxy-3'-naphthoyl-amino)-benz-imidazolone | ruby-red |
| 3 | H | —OCH$_3$ | " | " |
| 4 | 6-Cl | —OCH(CH$_3$)$_2$ | " | " |
| 5 | 4-Cl | —OCH$_3$ | " | red-violet |
| 6 | 4-OCH$_3$ | —OCH$_3$ | " | violet |
| 7 | 4-NO$_2$ | —OCH$_3$ | " | " |
| 8 | 4-NO$_2$, 6-CF$_3$ | —OCH$_3$ | " | " |
| 9 | 4-NO$_2$, 6-CH$_3$ | —OC$_2$H$_5$ | " | " |
| 10 | 6-NO$_2$ | —OCH$_3$ | " | " |
| 11 | 6-CF$_3$ | —OCH(CH$_3$)$_2$ | " | " |
| 12 | 6-Cl | —OCH$_3$ | 2-Hydroxy-3-naphthoic-acid-2',4'-di-methoxy-5'-chlorophenyl-amide | ruby-red |
| 13 | 6-Br | —OCH$_3$ | 2-Hydroxy-3-naphthoic-acid-2',4'-di-methoxy-5'-bromophenyl-amide | " |
| 14 | 4-OC$_2$H$_5$ | —OCH$_3$ | 5-(2'-Hydroxy-3'-naphthoyl-amino)-benz-imidazolone | violet |
| 15 | 5-NO$_2$ | —OC$_2$H$_5$ | " | brownish-red |

EXAMPLE 16

45.5 Parts of the dry monoazocarboxylic acid of the formula the mixture is heated to 105°–110° over the course of 15 hours while stirring. The pigment of the formula

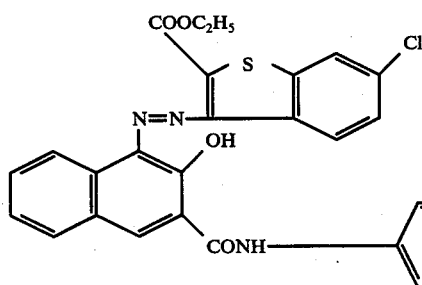
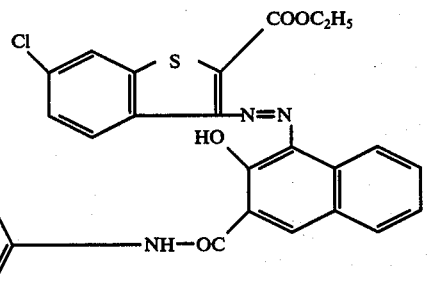

precipitates in the form of fine crystals. It is separated from the solvent by filtration while still hot and washed, first with hot nitrobenzene, then with methanol and finally with water and dried at approximately 80° under vacuum. Treated in accordance with the conventional methods, the pigment gives blue-violet dyeings on plastics, e.g. polyvinyl chloride.

Replacing the 45.5 parts of the monoazocarboxylic acid of formula (a) by 46.6 parts of the compound of the formula

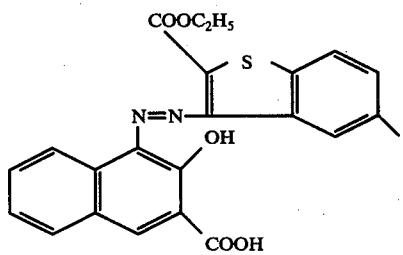

the pigment of the formula

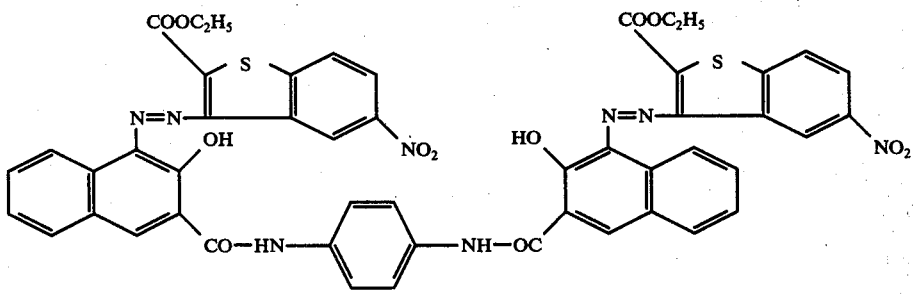

is obtained. Applied on plastics it gives red violet dyeings.

In the following Table 2 further diazotizable amines and bridge members ($R_5$ according to the formula I) are indicated which can be converted into valuable pigments according to the previous example.

TABLE 2

| Exp. No. | $R_1$ | B | $R_5$ | Shade of pigmentation in polyvinyl chloride |
|---|---|---|---|---|
| 17 | 6-Cl | —OCH$_3$ |  | violetish-brown |
| 18 | H | —OCH$_3$ |  | violet |

TABLE 2-continued

| Exp. No. | $R_1$ | B | $R_5$ | Shade of pigmentation in polyvinyl chloride |
|---|---|---|---|---|
| 19 | 6-Cl | —OCH$_3$ |  | " |
| 20 | H | —OCH(CH$_3$)$_2$ |  | " |
| 21 | H | —OCH$_3$ |  | " |
| 22 | H | —OCH$_3$ |  | " |
| 23 | H | —OCH$_3$ | 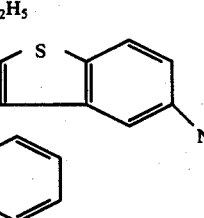 | " |
| 24 | H | —OCH$_3$ |  | " |

EXAMPLE 25

24.2 Parts of 3-amino-6-chlorobenzo-[b]-thiophene-2-carboxylic acid methyl ester are stirred for 1 hour in 35 parts of 30% hydrochloric acid and 100 parts of water an diazotized after the addition of 150 parts of ice with 26 parts by volume of 4n aqueous sodium nitrite solution. Stirring is continued for a further hour, a small amount of amidosulphonic acid is added, the whole is filtered off from impurities which may be present.

Coupling is effected by allowing the above described diazonium salt solution to flow slowly at 0° to 5° into a suspension of 23.3 parts of 5-acetoacetylaminobenzimidazolone (obtained by dissolution in 250 parts of water and 20 parts by volume of 30% caustic soda solution and addition of 20 parts by volume of 50% acetic acid). The mixture is stirred at 0°-5° for 1 hour, at 80° for 1 hour; it is then filtered, washed with water until free of salt and the residue is dried at approximately 80° in a vacuum. A pigment of the formula

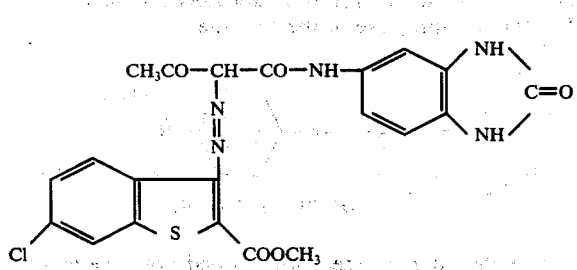

is obtained which dyes plastics in yellow shades.

The following Table 3 contains further diazotizable amines and coupling components which can be converted into valuable pigments according to the previous example.

TABLE 3

| Exp. No. | $R_1$ | B | Coupling Component | Shade of pigmentation in polyvinyl chloride |
|---|---|---|---|---|
| 26 | 6-Cl | —OC$_2$H$_5$ | 5-Acetoacetyl-aminobenzimi-dazolone | yellow |
| 27 | H | —OCH$_3$ | " | " |
| 28 | 6-Cl | —OCH(CH$_3$)$_2$ | " | " |
| 29 | 6-Cl | —OCH$_3$ | 1,4-Bis-(aceto-acetylamino)-benzene | " |
| 30 | 6-Cl | —OCH$_3$ | 1,4-Bis-(aceto-acetylamino)-2,5-dichloro-benzene | " |
| 31 | 6-CF$_3$ | —OC$_3$H$_7$ | 1,5-Bis-(aceto-acetylamino)-naphthalene | " |

EXAMPLE 32

24.2 Parts of 3-amino-6-chlorobenzo[b]-thiophene-2-carboxylic acid methyl ester are stirred for 1 hour in 35 parts of 30% hydrochloric acid and 100 parts of water and diazotized after the addition of 150 parts of ice with 26 parts of volume of 4n aqueous sodium nitrate solution. Stirring is continued for 1 further hour, a small amount of amidosulphonic acid is added, the whole is filtered and the pH is adjusted to 3.6 with 60 parts by volume of 50% aqueous sodium acetate solution.

Coupling is effected by allowing a solution of 15 parts of 3-cyano-4-methyl-6-hydroxypyridone in 200 parts of water and 10 parts of volume of 30% caustic soda solution to flow in slowly at 0°-5° with good stirring. The whole is stirred at 0°-5° for 1 hour, and at 80° for 1 hour, it is then filtered washed with water until free of salt and the residue is dried at approximately 80° in a vacuum. A pigment of the formula

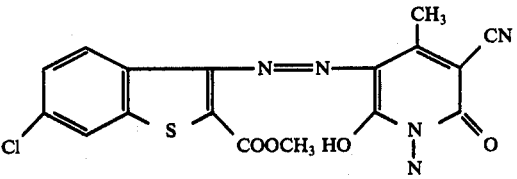

is obtained which dyes plastics in orange shades.

To improve the fastness and application properties, particularly the rheological behaviour and the dispersibility, the pigment may be treated with solvent, e.g. dimethylformamide.

EXAMPLE 33

12.6 Parts of 3-amino-5-nitrobenzo-[b]-thiophene-2-carboxylic acid methyl ester are added in small portions at 0° over the course of 20 minutes to 78.6 parts of nitrosyl sulphuric acid (consisting of 75 parts of concentrated sulphuric acid and 3.6 parts of sodium nitrite). The mixture is stirred at 0° for 3 hours, poured on 130 parts of ice and a small amount of amidosulphonic acid is added. The mixture is then filtered and the pH is adjusted to 3.3 with 50% aqueous sodium acetate solution.

Coupling is effected by allowing a solution of 17.9 parts of 2-hydroxy-3-naphthoic acid-2',4'-dimethoxy-5'-chlorophenyl amide in 200 parts of water and 7 parts by volume of 30% caustic soda solution to flow in slowly at 0°-5° with good stirring.

The mixture is stirred at 0°-5° for 1 hour and at 80° for 1 hour, it is then filtered, washed with water until free of salt and the residue is dried at approximately 80° in a vacuum. A pigment of the formula

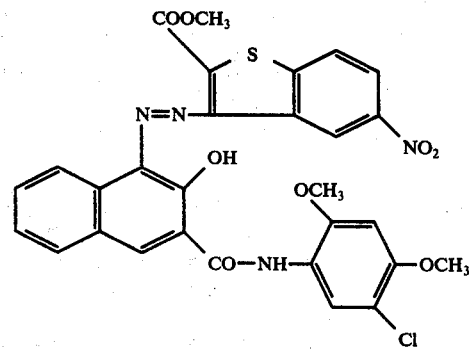

is obtained which dyes plastics in red violet shades.

EXAMPLE 34

28.1 Parts of the dry monoazocarboxylic acid of the formula

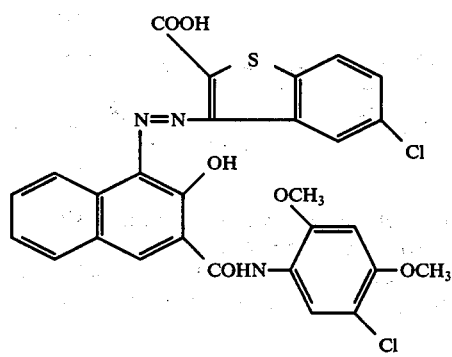

obtained by coupling the diazotized 3-amino-6-chlorobenzo[b]-thiophene-2-carboxylic acid (obtained for example in analogy with J.Org.Chem. 38, 2451 (1973)) and 2-hydroxy-3-naphthoic acid-2',4'-dimethoxy-5'-chlorophenyl amide, are added to 300 parts of nitrobenzene and 9 parts of thionyl chloride, and the mixture is heated to 105°-110° over the course of 2½ hours while stirring. The reaction solution is then cooled to 70°-80° and the excess thionyl chloride, together with a small quantity of nitrobenzene, is distilled off in a vacuum. Gaseous ammonia is introduced for several hours at 105°-110° whereupon the pigment of the formula

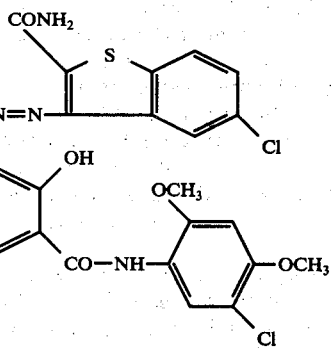

settled out in finely crystalline form. It is separated from the solvent by filtration while still hot and washed, first with hot nitrobenzene, then with methanol and finally with water and dried at approximately 80° under vacuum.

The pigment is finely ground in accordance with conventional methods and thereupon dyes plastics, e.g. polyvinyl chloride, in red violet shades.

Introducing methylamine or dimethylamine instead of ammonia, the corresponding methyl or dimethylamine is obtained which has very similar dyeing properties is obtained.

EXAMPLE 35

24.2 Parts of 3-amino-6-chorobenzo-[b]-thiophene-2-carboxylic acid methyl ester are stirred for 1 hour in 35 parts of 30% hydrochloric acid and 100 parts of water and diazotized after the addition of 150 parts of ice with 26 parts by volume of 4n aqueous sodium nitrite solution. Stirring is continued for 1 further hour, a small amount of amidosulphonic acid is added, the whole is filtered and the pH is adjusted to 3.6 with 60 parts by volume of 50% aqueous sodium acetate solution.

Coupling is effected by adding slowly with good stirring a mixture consisting of 28.9 parts of 3-(N-β-cyanoethyl-N-β-acetoxyethyl)-amino-acetamidobenzene, 50 parts of glacial acetic acid and 100 parts of ice. The whole is stirred for approximately 30 minutes and thus the resulting dye of the formula

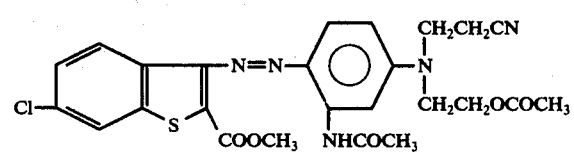

precipitates. It is filtered off, washed with water and dried. The dyeing preparation, produced from this compound, dyes polyester fibre material in yellowish red shades with excellent fastnesses.

In analogy with the above Example the dyes indicated in the following Table 4 and corresponding to formula

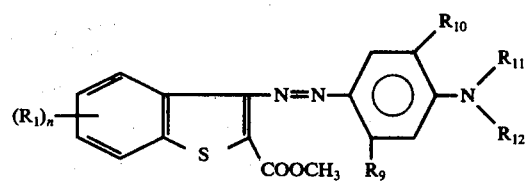

may be produced.

TABLE 4

| Exp. No. | $(R_1)_n$ | $R_9$ | $R_{10}$ | $R_{11}$ | $R_{12}$ | Shades on Polyester fibre material. |
|---|---|---|---|---|---|---|
| 36 | 7-NO$_2$ | —NHCOCH$_3$ | H | —CH$_2$CH$_2$CN | —CH$_2$CH$_2$—O—COCH$_3$ | red |
| 37 | 5,7-dinitro | —NHCOCH$_3$ | H | —CH$_2$CH$_2$CN | —CH$_2$CH$_2$—O—COCH$_3$ | bluish-red |
| 38 | 5-NO$_2$ | —NHCOCH$_3$ | H | —CH$_2$CH$_2$CN | —CH$_2$CH$_2$—O—COCH$_3$ | red |
| 39 | 4-NO$_2$ | —NHCOCH$_3$ | H | —CH$_2$CH$_2$CN | —CH$_2$CH$_2$—O—COCH$_3$ | red |
| 40 | 6-NO$_2$ | —NHCOCH$_3$ | H | —CH$_2$CH$_2$CN | —CH$_2$CH$_2$—O—COCH$_3$ | yellowish-red |
| 41 | 5-NO$_2$ | —NHCOCH$_3$ | H | —CH$_2$CH$_3$ | —CH$_2$CH$_3$ | red |
| 42 | 6-Cl | —NHCOCH$_3$ | H | —CH$_2$CH$_3$ | —CH$_2$CH$_3$ | red |
| 43 | 5-NO$_2$ | —NHCOCH$_3$ | H | —CH$_2$CH$_3$ | —CH$_2$CH$_2$CN | red |
| 44 | 5-NO$_2$ | —NHCOCH$_3$ | H | —CH$_2$CH$_3$ | —CH$_2$COOCH$_3$ | red |
| 45 | 6-Br | H | H | —CH$_2$CH$_2$CN | —CH$_2$CH$_2$OCOCH$_3$ | red |
| 46 | 5,7-dinitro | —NHCOCH$_3$ | —OC$_2$H$_5$ | —CH$_2$CH$_2$OCOCH$_3$ | —CH$_2$CH$_2$OCOCH$_3$ | reddish-blue |
| 47 | 6-Cl | —CH$_3$ | H | —CH$_2$CH$_2$CN | —CH$_2$CH$_2$OCOCH$_3$ | yellowish-red |

APPLICATION EXAMPLE 1

0.5 Parts of the pigment, obtained in accordance with Example 1, and 5 parts of titanium dioxide pigment are added to a mixture consisting of 63 parts of a polyvinyl chloride emulsion,
32 parts of dioctyl phthalate,
3 parts of a commercial epoxy softener,
1.5 parts of a commercial stabilizer (barium-cadmium-stearate mixture), and
0.5 parts of a commercial chelator, and the whole is intimately mixed. The mixture is rolled at 160° for 8 minutes in a roller mill with friction rollers (one roller rotates at 20 r.p.m., the second at 25 r.p.m.) to obtain a good distribution of the pigment. The mixture is subsequently extruded as a film of 0.3 mm thickness. The film is pigmented in a brownish red shade which has very good light and migration fastness and heat resistance.

APPLICATION EXAMPLE 2

A mixture of 7 parts of the dye, produced in accordance with Example 36, 4 parts of sodium dinaphthyl methane disulphonate, 4 parts of sodium cetyl sulphate and 5 parts of anhydrous sodium sulphate is ground in a ball mill over the course of 48 hours to give a fine powder.

1 Part of the obtained dyeing preparation is pasted with a small amount of water and the resulting suspension is added through a sieve to a bath of 4000 parts of water containing 3 parts of sodium lauryl sulphate. The bath proportion is 1:40. 100 parts of a purified fabric of polyester fibre are entered into the dyebath at 40°-50° which is then set with an emulsion of 20 parts of a chlorinated benzene in water. The bath is slowly heated to 100° and the fabric dyed at 95°-100° for 2 hours. The fabric dyed in yellowish red shades is washed, soaped, washed again and dried. The level dyeing has notable fastness to light, cross dyeing, washing, water, sea water, perspiration, sublimation, gas fumes, thermofixation, pleating and permanent press finishing.

What is claimed is:

1. A compound of the formula

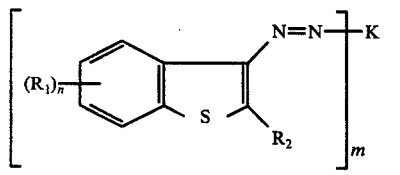

wherein each $R_1$ is independently halo, $C_{1-8}$alkyl, substituted $C_{1-8}$alkyl, $C_{5-8}$cycloalkyl, substituted $C_{5-8}$cycloalkyl, $C_{1-8}$alkoxy, substituted $C_{1-8}$alkoxy, $C_{5-8}$cycloalkyloxy, substituted $C_{5-8}$cycloalkyloxy, trifluoromethyl or nitro, $R_2$ is carboxy, carbamoyl, ($C_{1-8}$alkyl)carbamoyl, (substituted $C_{1-8}$alkyl)carbamoyl, ($C_{5-8}$cycloalkyl)carbamoyl, (substituted $C_{5-8}$cycloalkyl)carbamoyl, di-($C_{1-8}$alkyl)carbamoyl, di-(substituted $C_{1-8}$alkyl)carbamoyl, N-$C_{1-8}$alkyl-N-(substituted $C_{1-8}$alkyl)carbamoyl, phenylcarbamoyl, substituted phenylcarbamoyl, ($C_{1-8}$alkoxy)carbonyl, (substituted $C_{1-8}$alkoxy)carbonyl, ($C_{5-8}$cycloalkyloxy)carbonyl, (substituted $C_{5-8}$cycloalkyloxy)carbonyl, phenoxycarbonyl, substituted phenoxycarbonyl or cyano, K is

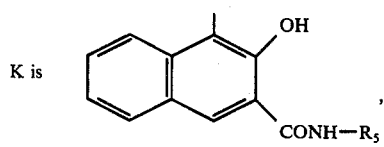

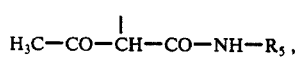

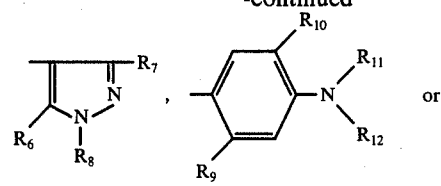

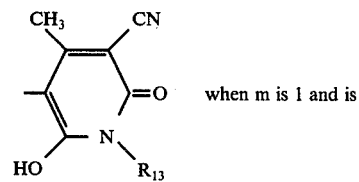

when m is 1 and is

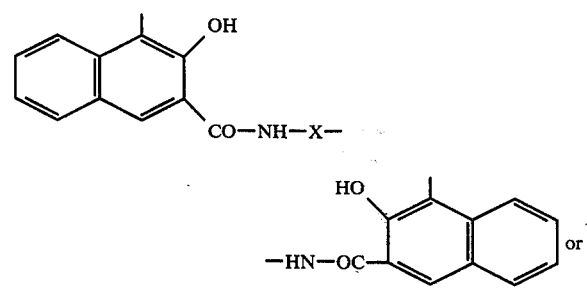

when $m$ is 2, wherein $R_5$ is phenyl; phenyl substituted by 1-3 substituents each of which is independently chloro, bromo, methyl, methoxy or trifluoromethyl or benzimidazolonyl-5, $R_6$ is hydroxy or amino, $R_7$ is hydrogen, methyl, phenyl, methoxycarbonyl or ethoxycarbonyl, $R_8$ is hydrogen, methyl, ethyl, phenyl or phenyl substituted by 1-3 substituents each of which is independently chloro, bromo, cyano, nitro, methyl, methoxy or ethoxy, $R_9$ is hydrogen; methyl; formamido; ($C_{1-4}$alkyl)carbonylamino; ($C_{1-4}$alkyl)carbonylamino monosubstituted by chloro, bromo, phenyl, $C_{1-4}$alkoxy or phenoxy; ($C_{1-4}$alkoxy)carbonylamino; ($C_{1-4}$alkoxy)carbonylamino monosubstituted by chloro, bromo, phenyl, $C_{1-4}$alkoxy or phenoxy; $C_{1-4}$alkylsulfonylamino or $C_{1-4}$alkylsulfonylamino monosubstituted by chloro, bromo, phenyl, $C_{1-4}$alkoxy or phenoxy, $R_{10}$ is hydrogen, methoxy or ethoxy, $R_{11}$ is $C_{1-4}$alkyl or $C_{1-4}$alkyl or $C_{1-4}$alkyl monosubstituted by chloro, bromo, cyano, hydroxy, methoxy, ethoxy, phenyl, phenoxy, ($C_{1-4}$alkyl)carbonylamino, ($C_{1-4}$alkyl)carbonyloxy, ($C_{1-4}$alkoxy)carbonyl or ($C_{1-4}$alkoxy)carbonyloxy, $R_{12}$ is hydrogen, $C_{1-4}$alkyl or $C_{1-4}$alkyl monosubstituted by chloro, bromo, cyano, hydroxy, methoxy, ethoxy, phenyl, phenoxy, ($C_{1-4}$alkyl)carbonylamino, ($C_{1-4}$alkyl)carbonyloxy, ($C_{1-4}$alkoxy)carbonyl or ($C_{1-4}$alkoxy)carbonyloxy, $R_{13}$ is hydrogen, phenyl, amino, $C_{1-4}$alkylamino, di-($C_{1-4}$alkyl)amino, $C_{1-4}$alkyl or $C_{1-4}$alkyl monosubstituted by chloro, bromo, cyano, hydroxy, methoxy, ethoxy, phenyl, phenoxy, ($C_{1-4}$alkyl)- carbonylamino, ($C_{1-4}$alkyl)carbonyloxy, ($C_{1-4}$alkoxy)carbonyl or ($C_{1-4}$alkoxy)carbonyloxy, and
X is a direct bond,

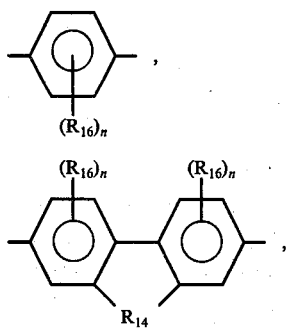

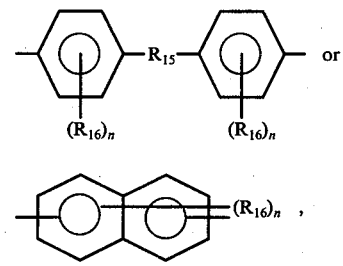

wherein $R_{14}$ is two hydrogen, —$SO_2$—, —NH—, —O— or —S, $R_{15}$ is —O—, —S—, —$CH_2$—, —NH—, —CO— or —$SO_2$—, each $R_{16}$ is independently chloro, bromo, nitro, cyano, trifluoromethyl, methyl, methoxy, ethoxy, methoxycarbonyl or ethoxycarbonyl, and n is 0, 1 or 2, m is 1 or 2, and n is 0, 1 or 2, wherein each substituted $C_{1-8}$alkyl and substituted $C_{1-8}$alkoxy group and moiety independently has 1 or 2 substituents each of which is independently halo, cyano, hydroxy, $C_{1-4}$alkoxy, phenyl, phenoxy, acyl, acyloxy or acylamino, each substituted $C_{5-8}$cycloalkyl and substituted $C_{5-8}$cycloalkyloxy group and moiety independently has 1 or 2 substituents each of which is independently $C_{1-4}$alkyl, halo, cyano, hydroxy, $C_{1-4}$alkoxy, phenyl, phenoxy, acyl, acyloxy or acylamino, each substituted phenyl and substituted phenoxy moiety independently has 1 or 2 substituents each of which is independently nitro, $C_{1-4}$alkyl, halo, cyano, hydroxy, $C_{1-4}$alkoxy, phenyl, phenoxy, acyl, acyloxy or acylamino, each acyl and acyl moiety of acyloxy and acylamino is independently R—Y— or R'—Z—, wherein R is $C_{1-4}$alkyl; $C_{1-4}$alkyl substituted by 1 or 2 substituents each of which is independently halo, cyano, hydroxy, $C_{1-4}$alkoxy, phenyl or phenoxy; phenyl or phenyl substituted by 1 or 2 substituents each of which is independently nitro, $C_{1-4}$alkyl, halo, cyano, hydroxy, $C_{1-4}$alkoxy, phenyl or phenoxy, Y is —O—CO—, —$SO_2$— or —$OSO_2$—, Z is —CO—, —NR'—CO— or —NR'—$SO_2$—, and R' is hydrogen; $C_{1-4}$alkyl; $C_{1-4}$alkyl substituted by 1 or 2 substituents each of which is independently halo, cyano, hydroxy, $C_{1-4}$alkoxy, phenyl or phenoxy; phenyl or phenyl substituted by 1 or 2 substituents each of which is independently nitro, $C_{1-4}$alkyl, halo, cyano, hydroxy, $C_{1-4}$alkoxy, phenyl or phenoxy, and each halo is independently fluoro; chloro or bromo.

2. A compound according to claim 1 wherein m is 1.

3. A compound according to claim 2 wherein K

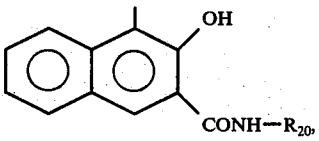

wherein $R_{20}$ is phenyl; phenyl substituted by 1–3 substituents each of which is independently chloro or methoxy or benzimidazolonyl-5.

4. A compound according to claim 3 wherein $R_{20}$ is benzimidazolonyl-5.

5. A compond according to claim 1 wherein each $R_1$ is independently halo, $C_{1-4}$alkyl, $C_{1-4}$alkoxy, trifluoromethyl or nitro, $R_2$ is carboxy, carbamoyl, ($C_{1-4}$alkyl)carbamoyl, di-($C_{1-4}$alkyl)carbamoyl, phenylcarbamoyl, ($C_{1-4}$alkoxy)carbonyl, phenoxycarbonyl or cyano and each halo is independently chloro or bromo.

6. A compound according to claim 5 having the formula

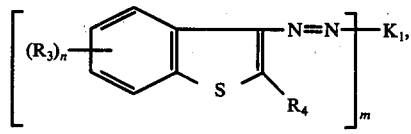

wherein each $R_3$ is independently chloro, bromo, methyl, $C_{1-4}$alkoxy, trifluoromethyl or nitro, $R_4$ is ($C_{1-4}$alkoxy)carbonyl, phenoxycarbonyl, carbamoyl, ($C_{1-4}$alkyl)carbamoyl, di-($C_{1-4}$alkyl)carbamoyl, phenylcarbamoyl or carboxy, m is 1 or 2, n is 0, 1 or 2, and $K_1$ is

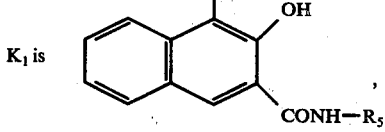

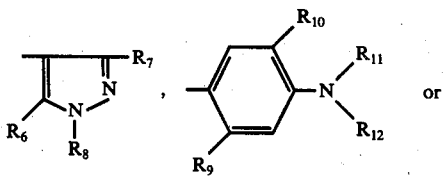

-continued

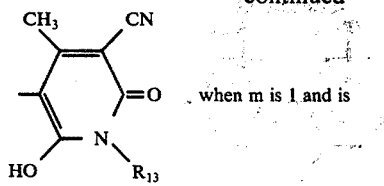
when m is 1 and is

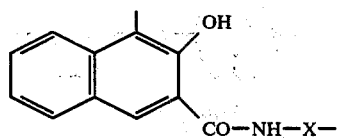

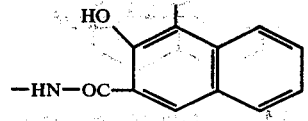

or H₃C—CO—CH—NH—X—HN—OC—CH—OC—CH₃ when m is 2,
wherein R₅ is phenyl; phenyl substituted by 1-3 substituents each of which is independently chloro, bromo, methyl, methoxy or trifluoromethyl or benzimidazolonyl-5, R₆ is hydroxy or amino, R₇ is hydrogen, methyl, phenyl, methoxycarbonyl or ethoxycarbonyl, R₈ is hydrogen, methyl, ethyl, phenyl or phenyl substituted by 1-3 substituents each of which is independently chloro, bromo, cyano, nitro, methyl, methoxy or ethoxy, R₉ is hydrogen; methyl; formamido; (C₁₋₄alkyl)carbonylamino; (C₁₋₄alkyl)carbonylamino monosubstituted by chloro, bromo, phenyl, C₁₋₄alkoxy or phenoxy; (C₁₋₄alkoxy)carbonylamino; (C₁₋₄alkoxy)carbonylamino monosubstituted by chloro, bromo, phenyl, C₁₋₄alkoxy or phenoxy; C₁₋₄alkylsulfonylamino or C₁₋₄alkylsulfonylamino monosubstituted by chloro, bromo, phenyl, C₁₋₄alkoxy or phenoxy, R₁₀ is hydrogen, methoxy or ethoxy, R₁₁ is C₁₋₄alkyl or C₁₋₄alkyl monosubstituted by chloro, bromo, cyano, hydroxy, methoxy, ethoxy, phenyl, phenoxy, (C₁₋₄alkyl)carbonylamino, (C₁₋₄alkyl)carbonyloxy, (C₁₋₄alkoxy)carbonyl or (C₁₋₄alkoxy)carbonyloxy, R₁₂ is hydrogen, C₁₋₄alkyl or C₁₋₄alkyl monosubstituted by chloro, bromo, cyano, hydroxy, methyl, ethoxy, phenyl, phenoxy, (C₁₋₄alkyl)carbonylamino, (C₁₋₄alkyl)carbonyloxy, (C₁₋₄alkoxy)carbonyl or (C₁₋₄alkoxy)carbonyloxy, R₁₃ is hydrogen, phenyl, amino, C₁₋₄alkylamino, di-(C₁₋₄alkyl)amino, C₁₋₄alkyl or C₁₋₄alkyl monosubstituted by chloro, bromo, cyano, hydroxy, methoxy, ethoxy, phenyl, phenoxy, (C₁₋₄alkyl)carbonylamino, (C₁₋₄alkyl)carbonyloxy, (C₁₋₄alkoxy)carbonyl or (C₁₋₄alkoxy)carbonyloxy, and X is a direct bond,

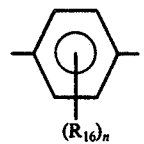

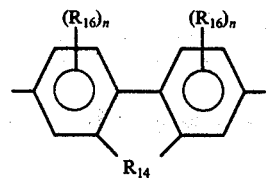

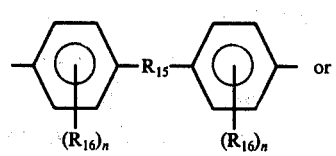

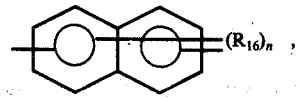

wherein R₁₄ is two hydrogens, —SO₂—, —NH—, —O— or —S,

R₁₅ is —O—, —S—, —CH₂—, —NH—, —CO— or —SO₂—, each R₁₆ is independently chloro, bromo, nitro, cyano, trifluoromethyl, methyl, methoxy, ethoxy, methoxycarbonyl or ethoxycarbonyl, and n is 0, 1 or 2.

7. A compound according to claim 6 wherein m is 1.

8. A compound according to claim 7 wherein K₁ is

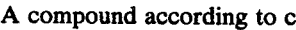

9. A compound according to claim 8 wherein R₅ is phenyl, phenyl substituted by 1-3 substituents each of which is independently chloro or methoxy or benzimidazolonyl-5.

10. A compound according to claim 9 wherein R₅ is benzimidazolonyl-5.

11. A compound according to claim 7 wherein K₁ is

H₃C—CO—CH—CO—NH—R₅.

12. A compound according to claim 7 wherein K₁ is

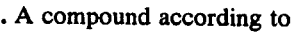

13. A compound according to claim 7 wherein $K_1$ is

[structure: benzene ring with $R_{10}$, $R_{11}$, $R_{12}$ on N, and $R_9$]

14. A compound according to claim 13 having the formula

[structure: benzothiophene-azo-aniline with $R_{25}$, $R_{26}$, $R_{27}$, $R_{28}$, $R_{29}$ and COOCH$_3$]

wherein each $R_{25}$ is independently chloro, bromo or nitro, $R_{26}$ is hydrogen, methyl, ($C_{1-4}$alkyl)carbonylamino or ($C_{1-4}$alkoxy)carbonylamino, $R_{27}$ is hydrogen, methoxy or ethoxy, each of $R_{28}$ and $R_{29}$ is independently hydrogen, cyano, hydroxy, ($C_{1-4}$alkyl)carbonyloxy, ($C_{1-4}$alkoxy)carbonyl or ($C_{1-4}$alkoxy)carbonyloxy, and $n$ is 0, 1 or 2.

15. A compound according to claim 7 wherein $K_1$ is

[structure: pyridone with CH$_3$, CN, HO, =O, $R_{13}$]

16. A compound according to claim 6 wherein $m$ is 2.

17. A compound according to claim 16 wherein $K_1$ is

[structure: two naphthalene units linked via CO—NH—X—HN—OC with OH groups]

18. A compound according to claim 17 wherein X is

[structure: benzene ring with $(R_{16})_n$]

-continued

[structure: biphenyl fused with $R_{14}$, $(R_{16})_n$]

[structure: two phenyl rings linked by $R_{15}$ with $(R_{16})_n$]

or [structure: naphthalene with $(R_{16})_n$]

19. A compound according to claim 18 wherein X is

[structure: benzene ring with $(R_{16})_n$]

20. A compound according to claim 18 wherein X is

[structure: naphthalene with $(R_{16})_n$]

21. A compound according to claim 16 wherein $K_1$ is $$H_3C-CO-\overset{|}{C}H-CO-NH-X-HN-OC-\overset{|}{C}H-OC-CH_3.$$

22. A compound according to claim 21 wherein X is

[structure: benzene ring with $(R_{16})_n$]

[structure: biphenyl fused with $R_{14}$, $(R_{16})_n$]

[structure: two phenyl rings linked by $R_{15}$ with $(R_{16})_n$]

or [structure: naphthalene with $(R_{16})_n$]

23. A compound according to claim 22 wherein X is

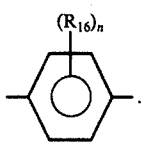

24. A compound according to claim 22 wherein X is

25. A compound according to claim 6 having the formula

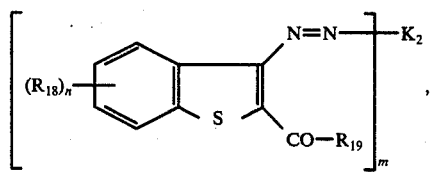

wherein each $R_{18}$ is independently chloro, bromo, methyl, methoxy, ethoxy, trifluoromethyl or nitro, $R_{19}$ is $C_{1-4}$alkoxy, amino, methylamino, ethylamino, dimethylamino, diethylamino or phenylamino, $m$ is 1 or 2, $n$ is 0, 1 or 2, and $K_2$ is

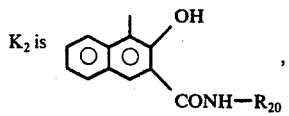

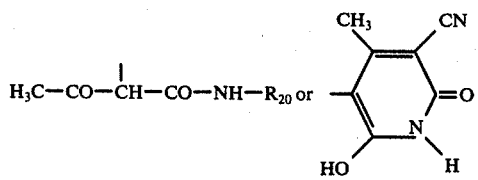

when $m$ is 1 and is

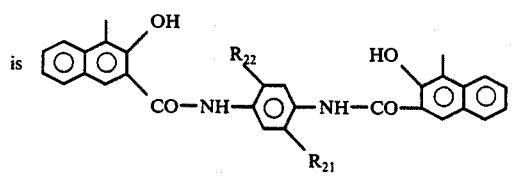

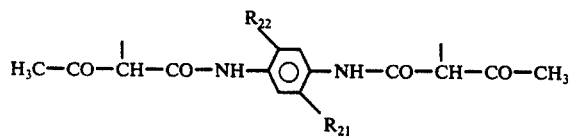

or

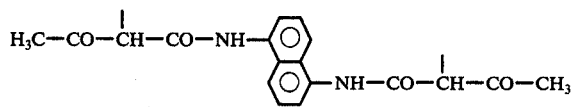

when $m$ is 2, wherein $R_{20}$ is phenyl; phenyl substituted by 1–3 substituents each of which is independently chloro or methoxy or benzimidazolonyl-5, and each of $R_{21}$ and $R_{22}$ is independently hydrogen, chloro, bromo, methyl or methoxy.

26. A compound according to claim 25 wherein $n$ is 0 or 1.

27. A compound according to claim 25 wherein each $R_{18}$ is independently chloro, bromo or nitro.

28. A compound according to claim 25 wherein $R_{19}$ is methoxy or ethoxy.

29. A compound according to claim 25 wherein $m$ is 1.

30. A compound according to claim 29 wherein $K_2$ is

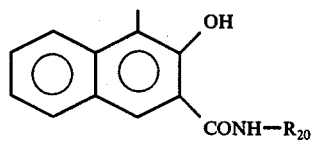

31. A compound according to claim 30 wherein $R_{20}$ is benzimidazolonyl-5.

32. A compound according to claim 29 wherein $K_2$ is

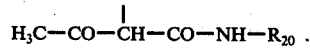

33. A compound according to claim 29 wherein $K_2$ is

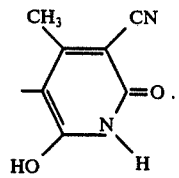

34. A compound according to claim 25 wherein $m$ is 2.

35. A compound according to claim 34 wherein $K_2$ is

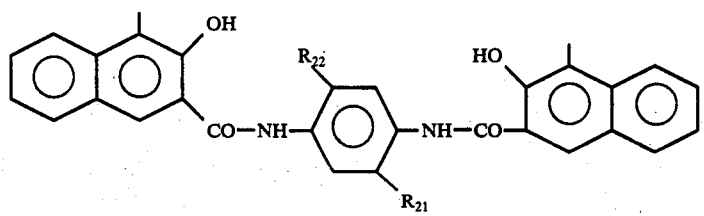
36. A compound according to claim 34 wherein $K_2$ is
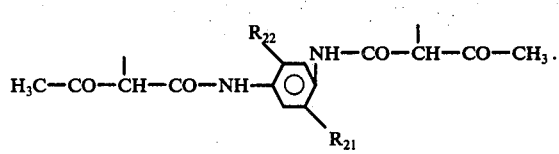
37. A compound according to claim 34 wherein $K_2$ is
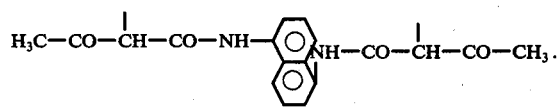
38. The compound according to claim 26 having the formula
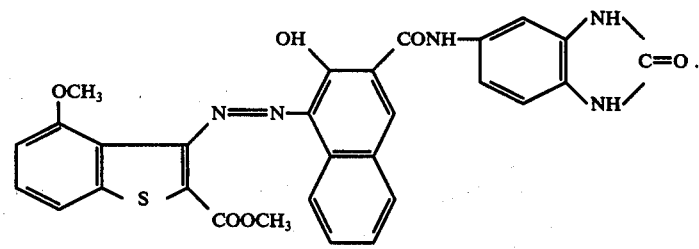
39. The compound according to claim 30 having the formula
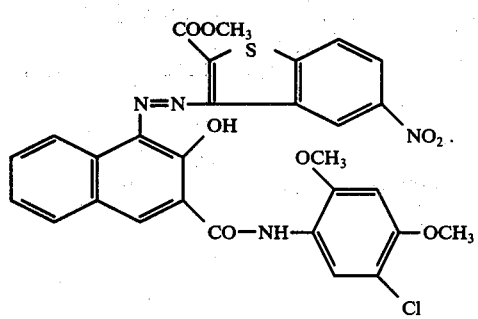
40. The compound according to claim 31 having the formula
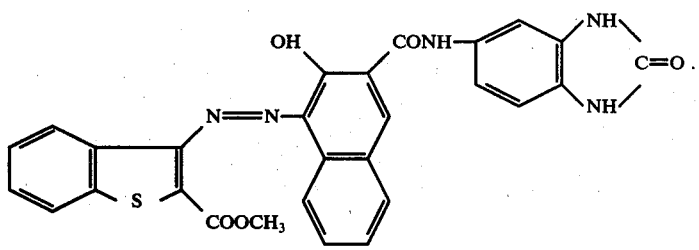
41. The compound according to claim 31 having the formula
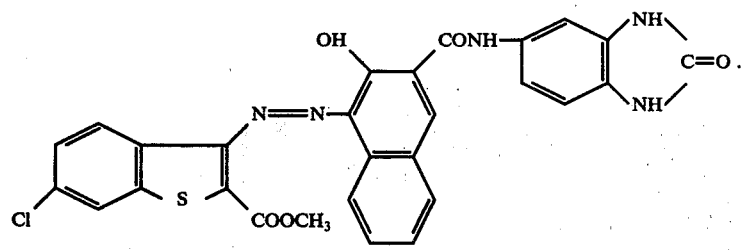
42. The compound according to claim 31 having the formula

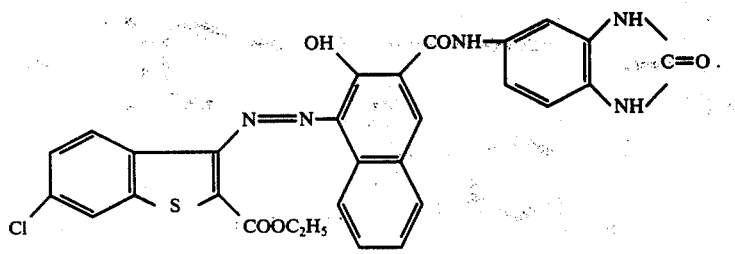

43. The compound according to claim 31 having the formula

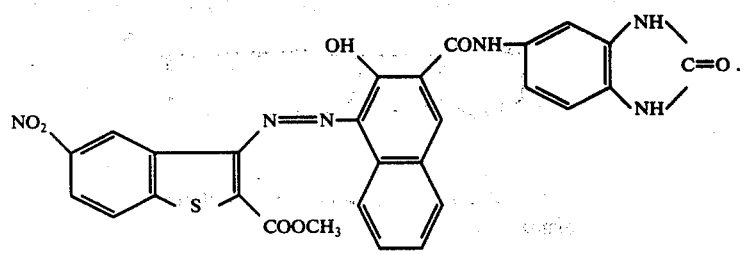

44. The compound according to claim 31 having the formula

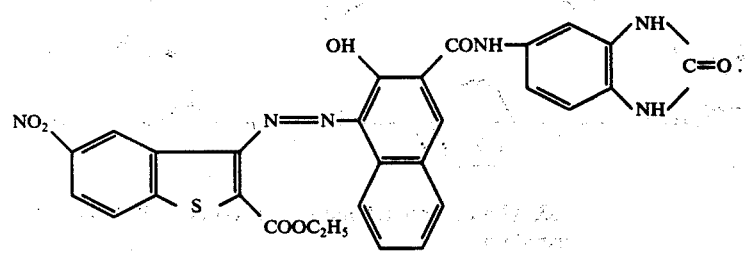

45. The compound according to claim 31 having the formula

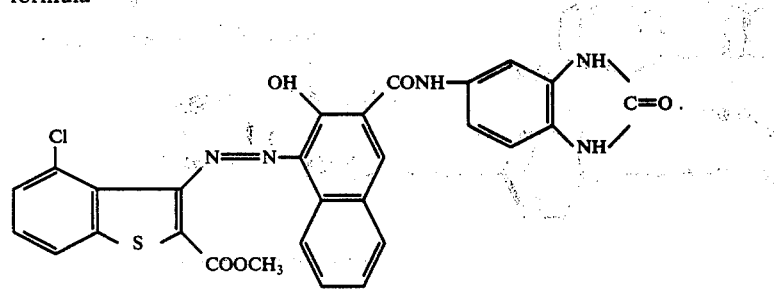

46. The compound according to claim 30 having the formula

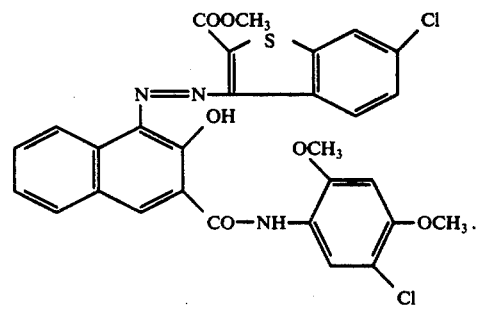

47. The compound according to claim 37 having the formula

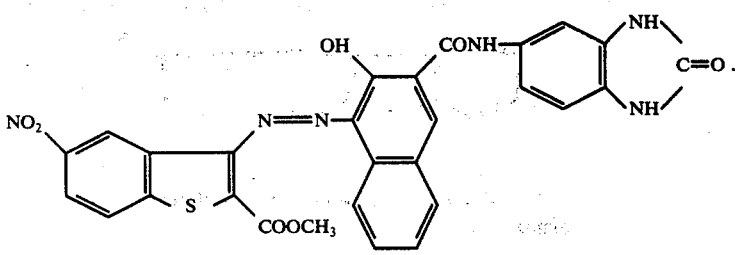

48. The compound according to claim 32 having the formula

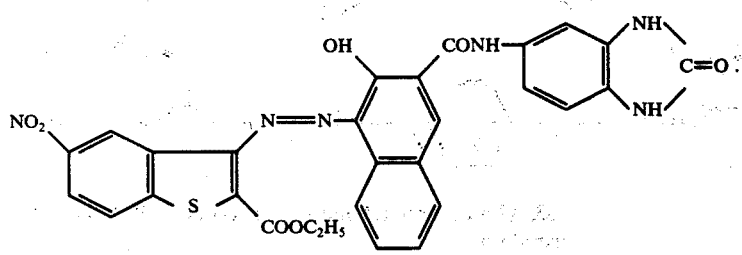

49. The compound according to claim 32 having the formula

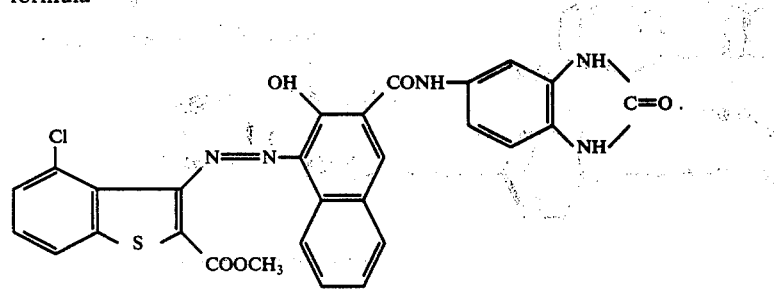

50. The compound according to claim 32 having the formula
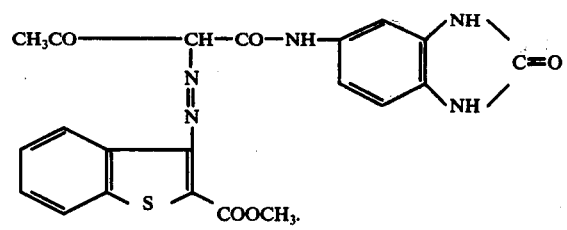
51. The compound according to claim 33 having the formula
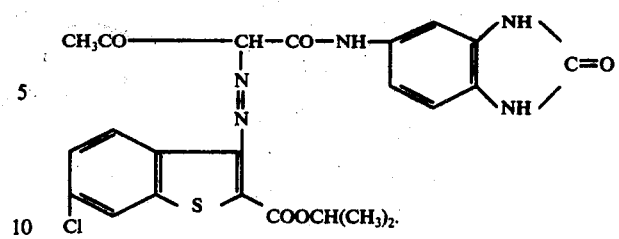
52. The compound according to claim 35 having the formula
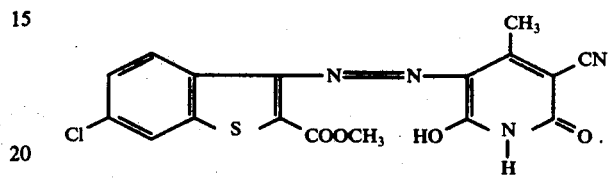
53. The compound according to claim 35 having the formula
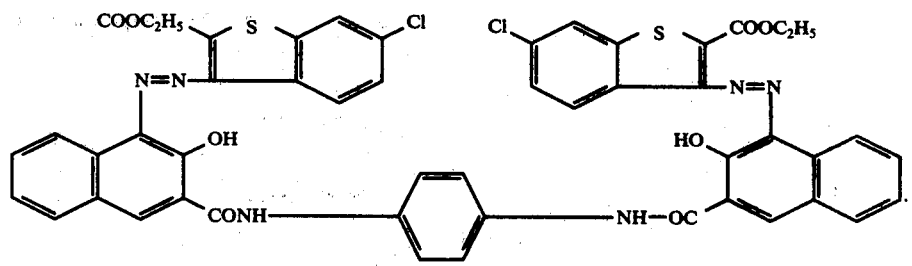
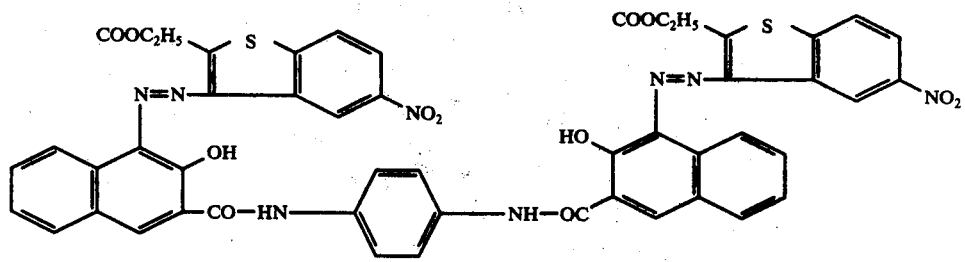
* * * * *